United States Patent [19]
Greenberg et al.

[11] 3,795,989
[45] Mar. 12, 1974

[54] EDUCATION APPARATUS

[76] Inventors: Lawrence J. Greenberg, 64 Mountain Ave., Larchmont, N.Y. 10538; Gregory E. Hyman, 19 Secard Ave., New Rochelle, N.Y.

[22] Filed: Feb. 21, 1973

[21] Appl. No.: 334,474

[52] U.S. Cl. .................................. 35/9 B, 84/470
[51] Int. Cl. ............................................. G09b 7/00
[58] Field of Search ............ 35/9 B, 9 C, 9 D, 31 C; 84/470, 476, 477 R, 478, 479, 481

[56] References Cited
UNITED STATES PATENTS

| | | |
|---|---|---|
| 1,201,769 | 10/1916 | Siegel .......................... 84/478 X |
| 3,115,803 | 12/1963 | Pedicano .......................... 84/470 |
| 3,376,778 | 4/1968 | Musser ........................... 84/470 X |
| 3,486,245 | 12/1969 | Nelson ............................ 35/31 C |
| 3,579,857 | 5/1971 | Lamberson ........................ 35/9 B |
| 3,699,668 | 10/1972 | Tesar ............................. 35/9 D |

*Primary Examiner*—Wm. H. Grieb
*Attorney, Agent, or Firm*—Henry Sternberg, Esq.

[57] ABSTRACT

An instructional device or educational toy having a question and answer format cooperating with a tone generator for generating a series of tones resulting in a recognizable melody in response to the user correctly answering a series of problems arranged in a predetermined sequence.

10 Claims, 9 Drawing Figures

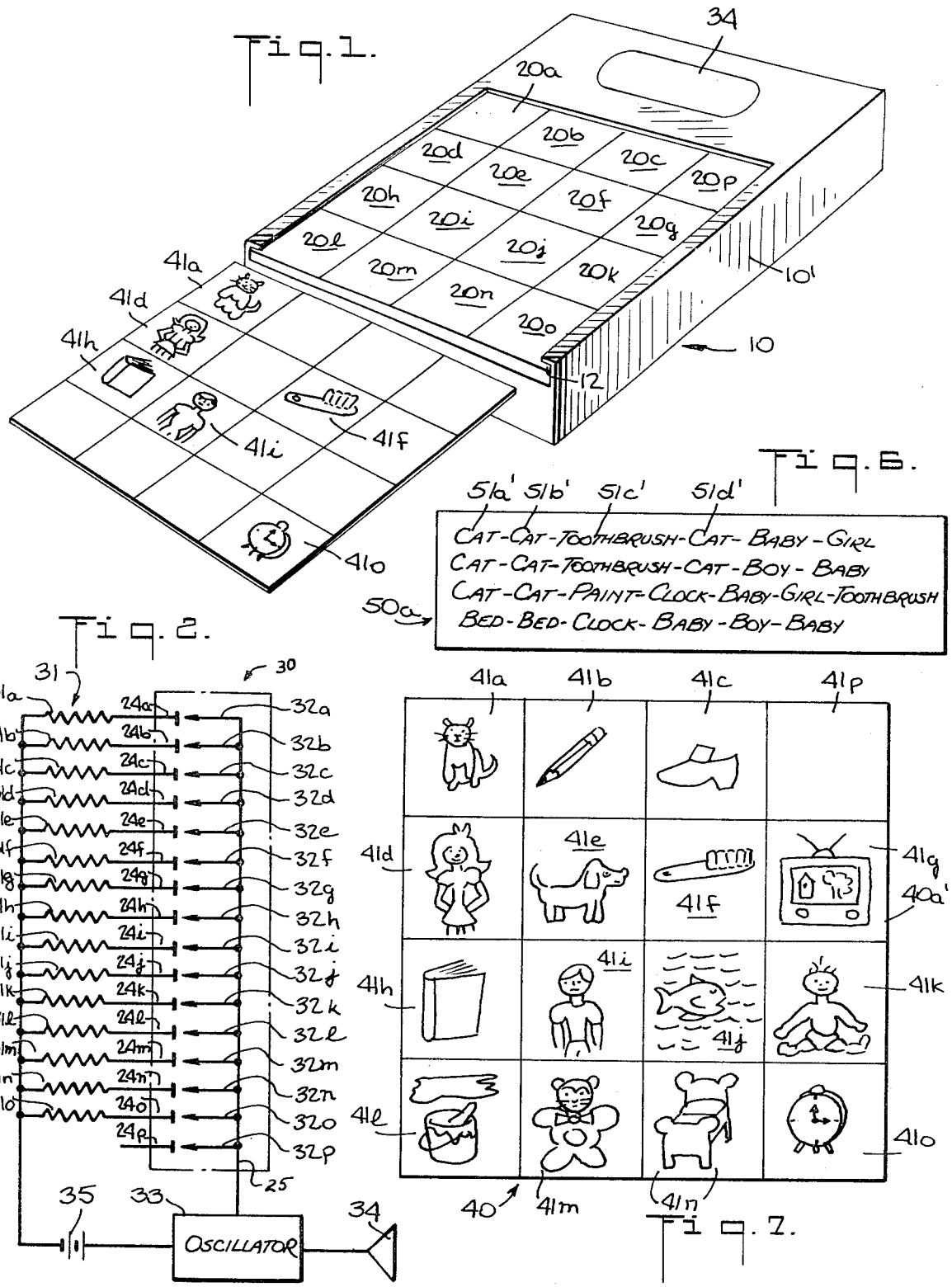

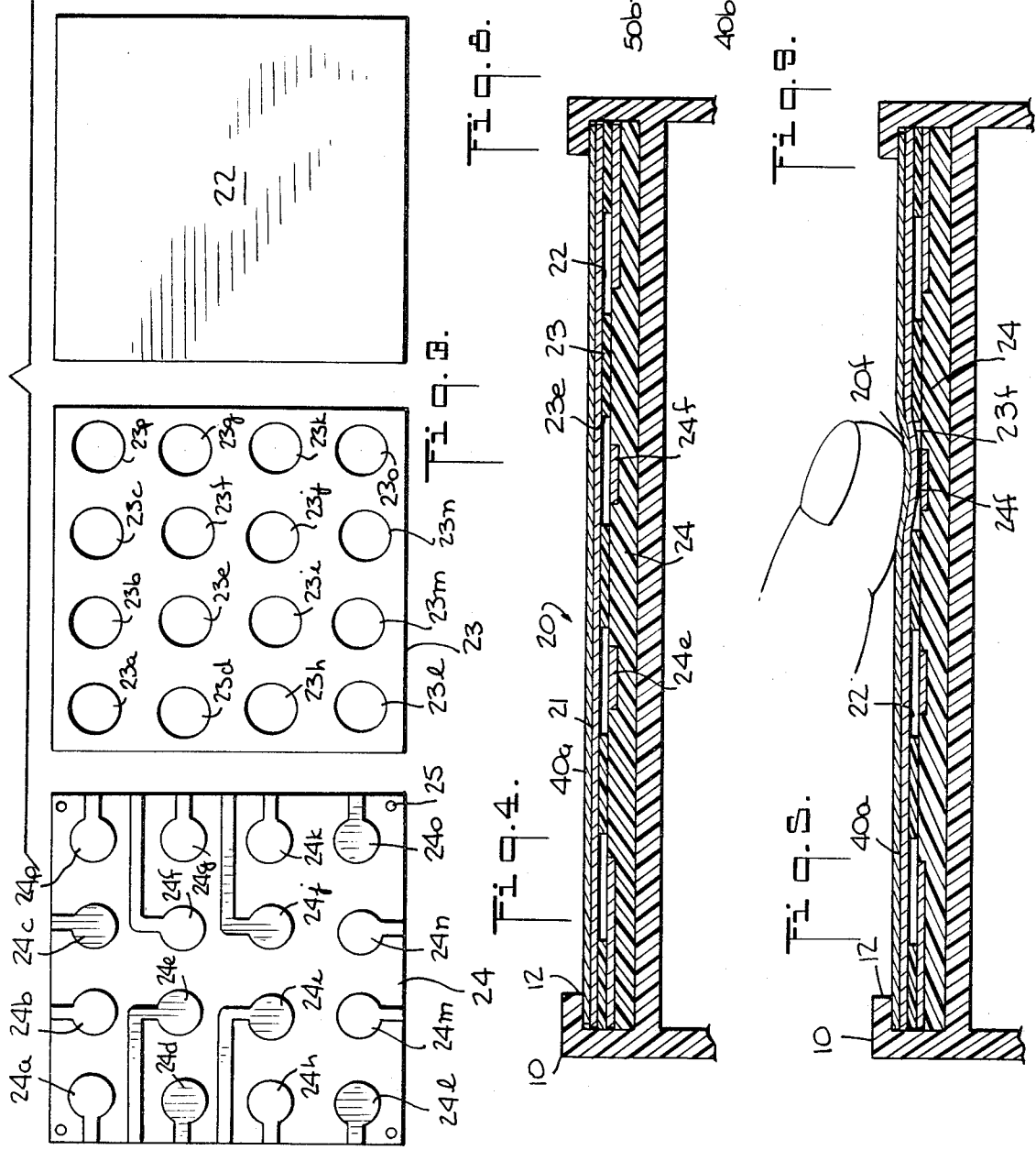

EDUCATION APPARATUS

BACKGROUND OF THE INVENTION

The present invention relates to an instructional device or educational toy having a question and answer format cooperating with a tone generator for generating a series of tones.

It is highly desirable for an instructional device or educational toy to be capable of a great variety of educational possibilities while still being simple enough for even young children to operate. It is also highly desirable for an instructional device or educational toy to be capable of rewarding the child when the lesson is properly learned and to provide a check on the correctness of the responses given by the child. According to one prior art device, for example that shown in U.S. Pat. No. 3,699,668, a buzzer sounds and/or a light lights in response to the student correctly answering a given problem.

As is common with known devices of this type, one question at a time is posed. The same monotonous response is always provided by the instrument if an answer is correctly given, namely, a buzzer buzzes or a light lights. Not only, therefore, is there no incentive for a speedy response, but the check for a correct answer is the same in all cases. There is lacking any semblance of a reward for correctly answering an entire series of problems, since, in such known devices, the questions and checks are handled on an individual problem by problem basis only.

SUMMARY OF THE INVENTION

Accordingly, it is a principal object of the present invention to provide an instructional method and apparatus which provides an incentive to the student not only for giving correct answers to each of an entire series of problems but for giving each of these answers more or less within predetermined time intervals which may be chosen by the manufacturer of the apparatus relative to the degree of difficulty of the corresponding question.

Another object of the present invention is to provide an instructional device or educational toy which is adaptable to and useful in the teaching of many different and varied subjects, for example, spelling, arithmetic, spacial relations, languages, etc., by the presentation of a series of problems and a group of corresponding multiple choice answers.

A further object of the present invention is to provide an instructional device or educational toy of the foregoing type that is portable, battery operated, inexpensive, simple to operate, and yet applicable to a wide range of educational subjects.

A concomitant object of the present invention is to provide a compact instrument of the foregoing type which is capable of providing not only a check on, but also a reward for, the strudent who correctly answers an entire series of presented problems.

In accordance with this invention there is provided a compact, easily operable instructional device or educational toy having a keyboard with a plurality of manually actuable keys, a preferably battery operated tone generator for producing a desired tone in response to actuation of a corresponding key, a series of interchangeable problem cards each carrying thereon a series of different problems in the form of symbolic representations, and a plurality of interchangeable keyboard cards each carrying symbolic representations identifying the various keys of the instrument. The arrangement of the symbols, i.e., their sequence on each problem card being such that in cooperation with an associated keyboard card, the proper solution of each individual problem on the problem card by actuation of the key corresponding to the correct answer symbol on the keyboard card, in the sequence shown on the problem card, will result in the instrument producing a recognizable melody.

BRIEF EXPLANATION OF THE DRAWINGS

The present invention will now be more fully described with reference to the accompanying drawings in which:

FIG. 1 is a perspective view of a preferred embodiment of an educational apparatus (when taken together with the instruction card illustrated in FIG. 6) constructed in accordance with the teachings of the present invention;

FIG. 2 is a schematic of the electric circuit for the embodiment illustrated in FIG. 1;

FIG. 3 is an exploded view of the series of layers comprising the keyboard and switch arrangement of the embodiment illustrated in FIG. 1;

FIG. 4 is a cross-sectional view of the keyboard of the apparatus of FIG. 1 showing the keyboard card, also in cross-section, in overlying relation with said keyboard;

FIG. 5 is a cross-sectional view of the keyboard of FIG. 4 showing one of the switches being actuated by finger pressure;

FIG. 6 is a top view of one of a group of interchangeable instruction cards used with the apparatus of FIG. 1;

FIG. 7 is a top view of an interchangeable keyboard card used in conjunction with the instruction card illustrated in FIG. 6;

FIG. 8 is a top view of another one of the group of interchangeable instruction cards, and FIG. 9 is a top view of the interchangeable keyboard card used in association with the instruction card illustrated in FIG. 8.

DESCRIPTION OF THE PREFERRED EMBODIMENT

Referring now to FIG. 1 of the accompanying drawings, the educational apparatus comprises a console unit 10 and a pair of associated question and answer cards 50a and 40a, respectively.

The console is housed in a housing 10' preferably fabricated of plastic material, which houses a tone generating means 30 (FIG. 2) capable of generating a plurality of individual tones, and a keyboard 20 for actuating the tone generating means 30 to produce the desired tones.

Keyboard 20 is preferably flat and has a top surface 20' divided into an imaginary grid of squares 20a, 20b, etc. Beneath each of these squares is an electrical switch 32a, 32b, etc.

Tone generating means 30 includes a series of resistors 31a, 31b, etc., each in circuit with a respective one of said switches 32, an oscillator 33, which may include an amplifier (not shown), and a loudspeaker 34, all in circuit with a source 35 of electric energy, preferably a battery. The circuit arrangement is such that upon closing any of the normally open switches 32, by pressing on the corresponding square 20a, 20b, etc. of the keyboard 20, a predetermined tone will be produced by the tone generator and will sound for as long as the switch remains closed. As is known in the art, such a circuit may be adjustable so that the frequencies of the individual tones will correspond to those produced by an ordinary piano.

The keyboard 20 provide the means for actuating the tuning circuit of tone generator 30 to produce a tone of given frequency. The pitch of the tone produced is of course determined by the value of the particular resistor 31a, 31b etc. The particular circuit configuration for the tone generator 30 is not critical to the invention and a different circuit configuration — for example, one having a series of capacitors rather than resistors — could also be used. Alternate means, both electrical and/or mechanical for producing such tones are also well known.

In its preferred form the instructional apparatus of the present invention utilizes a series of instruction, or problem, means in the form of cards 50a, 50b, etc., each of which has printed thereon a series of symbolic representations 51 such as, for example, a series of arithmetic problems, 51a, 51b, 51c, etc., (FIG. 8), or a series of spelled-out names of animate or inanimate objects 51a', 51b', 51c' (FIG. 6). The symbolic representations 51a', 51b', etc. on the instruction card 50a are such that a series of these symbolic representations are printed sequentially in a line or lines on each instruction card 50a, 50b, and, as will be explained, represent the sequence required (when used in conjunction with the keyboard, the tone generator circit and the keyboard card associated with the respective problem card) for playing a recognizable melody. Each of the symbolic representations 51' on the card 50a represents a complete problem and is of given species (in the illustrated example, the species is a spelled-out word). A different species, for example the pictorial representations of animate or inanimate objects 41a, 41b, 41c, etc., (FIG. 7) appear on the keyboard card 40a' which is used in conjunction with the problem, or instruction, card 50a. The student may be asked to find the pictorial representation corresponding in each case to the spelled-out word. Thus, for each occurrence of the word CAT, the student must find the symbol 41 which best corresponds thereto, namely, the picture 41a of a cat, FIG. 7. Cards 40a' and 50a thus form a pair of associated cards. Similarly, instruction card 50 a forms with keyboard card 40a another pair of associated cards. The keyboard card 40a, it will be noted, has some but not all, of the same symbolic representation as appears on the card 40a' and these are located in the same relative positions on each of the respective cards.

In a different field of endeavor, namely arithmetic, problem card 50b forms an associated pair with keyboard card 40b which carries multiple choice solutions for each of the problems on card 50b. As used herein the term "symbolic representation" is intended to mean a symbol representing one complete problem, such as "2 + 2" in the case of arithmetic problems, or "CAT" in the case of spelling problems.

As seen in FIG. 3 and FIG. 4, keyboard 20 preferably comprises a cover 21 of rubber or any other similarly flexible dielectric material; a flexible conductive layer 22 which may be a separate sheet but is preferably in the form of a conductive metal which may be vapor deposited directly on the undersurface of cover 21; a printed circuit board 24 located underneath the layer 22 and having exposed contacts 24a, 24b, etc. etched thereon, facing the conductive layer 22. The contacts 24a, 24b, etc. correspond to the keys, i.e., squares, on the keyboard 20 with each key having its corresponding contact located directly beneath it. The contacts 24a, 24b, etc. are each suitably connected in circuit with their corresponding resistor 31a, 31b, etc. as seen in FIG. 2. Separating the board 24 and the conductive layer 22 is an intermediate sheet 23 of dielectric material. This intermediate sheet 23 is provided with a plurality of openings 23a, 23b, etc. in registry with corresponding ones of the contacts 24a, 24b, etc. Thus contacts 24a, 24b, etc., are normally spaced from the overlying portions of the conductive layer 22 by a distance substantially equal to the thickness of intermediate sheet 23, preferably 1–2mm. The switches 32, formed by the contacts 24a, 24b, etc. and the conductive layer 22, are therefore all normally in open position. Ground pins 25 are provided at the corners of the circuit board. These ground pins extend upwardly through corresponding openings in the layer 23 into contact with conductive layer 22.

In operation, when finger pressure is applied to a key i.e., one of the areas 20a, 20b, etc, on the sheet 21 (FIG. 5) the portion of the flexible conductive layer 22 which is located directly under the depressed key is itself depressed, through the corresponding hole in sheet 23, into engagement with the contact directly beneath that hole. Ground pins 25 are always contacting conductive metal surface 22, thus creating a complete path for current to flow between the ground pins 25 and that one of the contacts 24a, 24b, etc. which is engaged by the conductive metal surface 22. The intermediate sheet 23 insures that only one contact on the printed circuit board 24 will be touched at a time when the rubber sheet 21 is depressed, so that adjacent switches will not be closed simultaneously.

Thus, in operation, the depression of key 20a closes switch 32a by touching the contact 24a with the conductive layer 22 through holes 23a. This completes the circuit through resistor 31a. Each resistor will cause the oscillator to produce a different frequency. These frequencies are preset and, in the preferred embodiment, their relationship to the keys is as follows:

| CHART I | | CHART II | |
|---|---|---|---|
| KEY | Frequency in HZ | KEY | Frequency in HZ (with key 20p depressed) |
| 20a | 233.08 | 20a | 466.16 |
| 20b | 246.94 | 20b | 493.88 |
| 20c | 261.63 | 20c | 523.25 |
| 20d | 277.18 | 20d | 554.37 |
| 20e | 293.66 | 20e | 587.33 |
| 20f | 311.13 | 20f | 622.25 |
| 20g | 329.63 | 20g | 659.26 |
| 20h | 349.23 | 20h | 698.46 |
| 20i | 369.99 | 20i | 739.99 |
| 20j | 392.00 | 20j | 783.99 |
| 20k | 415.30 | 20k | 830.61 |
| 20l | 440.00 | 20l | 880.00 |
| 20m | 466.16 | 20m | 932.33 |
| 20n | 493.88 | 20n | 987.77 |
| 20o | 523.25 | 20o | 1046.50 |

The 16th key i.e., key 20p actuates a resistor circuit (not shown) which shifts the entire keyboard range up in frequency by one octave, (Chart II), i.e., to the second harmonic of each of the original keys' frequencies.

According to the present invention each key of the keyboard is designated by a different symbolic representation. This key designating means is preferably in the form of a keyboard card such as, for example, card 40a (FIG. 1) of flexible material, which may be inserted in overlying relation with the keyboard 20 by sliding the card 40a in the dished out portion 11 of housing 10' along and between the grooves 12 thereof. The card 40a is approximately the same size and shape as the keyboard 20 so as to be substantially coextensive with the latter.

As noted above, each of the interchangeable series of instruction cards 50, only one of which is illustrated in FIG. 6, has at least one keyboard card 40a and/or 40a' associated therewith. The relationship between an instruction card and the keyboard card associated therewith and, in turn, between the inserted keyboard card and the keys of the keyboard is such that a correct answer to a given one of the problems on the instruction card will provide the desired note produced by the tone generator if the correct answer symbol on the inserted keyboard card is pressed. Thus, the symbolic representations on the instruction card, i.e., the series of problems appearing on the instruction card, are arranged thereon in such a sequence that if these problems are answered correctly in the sequence in which they appear on the instruction card, by sequentially depressing the correct squares on the keyboard card and thereby closing, in proper sequence, the corresponding switches underlying the same, a predetermined recognizable melody will be produced by the instrument. The illustrated pair of cards 40a' and 50a illustrate the sequencing of symbols on the instruction card and the positioning of related but different symbols on the keyboard card for producing the melody of the song "Happy Birthday" in conjunction with the frequency values and the keyboard arrangement described above. It will further be seen that by varying the positions of the symbolic representations on the keyboard card and/or varying the sequencing of the symbolic representations on the instruction card, different melodies may be produced. It will also be seen that by varying the symbolic representations different subject matter may be taught. An example of this is the instruction-keyboard card set shown in FIGS. 8 and 9, respectively, which combine to teach arithmetic. The cards of FIGS. 8 and 9 are illustrative only and not intended to result in any particular melody.

The terms "symbol" or "symbolic representation" are intended to include numerals and words, as well as pictures of animate or inanimate objects. By "different species" there is meant, for example, the difference in species between the numeral "7" and the spelled-out word "seven". Thus, the problem symbol "4 + 4" is of a different species than the answer symbol "8". As used herein, a symbol in the form of a problem of addition of two numerals, for example, is of a different species than a symbolic representation of the numeric answer form of that problem and vice versa. Each problem symbol, e.g., 51a', 51b', 51c' etc., is of a different species than that one of the keyboard symbols with which it is most closely related. That characteristic which more closely relates the problem symbol "3 + 3" with the keyboard symbol "6" than with any other of the keyboard symbols is the fact that the latter keyboard symbol represents the correct answer to the problem posed by the problem symbol (yet these symbols are of a different species, i.e., the problem symbol include a pair of numerals separated by a plus sign while the answer symbol includes only a single numeral).

While, according to the preferred embodiment of this invention, there is contemplated an interchangeable keyboard card of plastic sheet material which is sufficiently flexible to be depressed as shown in FIG. 5, but sufficiently rigid to retain its shape while being slid into place overlying the keyboard 20, as shown in FIG. 1, it will be understood that keyboard cards of more rigid material, but provided with openings through which push buttons may project, may be used in conjunction with keyboards having typewriter-type push button. In the latter instance the symbolic representations will be positioned on the keyboard card adjacent to the openings through which the push buttons project. Also, by providing on each key, a plurality of symbolic representations from different fields of study and by printing these symbols directly on the keyboard cover 21, it is possible to increase the versatility of the instrument without the use of interchangeable keyboard cards. In the latter instance the sheet 21 would itself become the keyboard designating means. By providing, on each key, different symbols representing different fields of study, the console 10 may still be used with interchangeable instruction cards covering a plurality of subjects. Thus, for example, in addition to being numbered, each key could also have printed thereon a pictorial representation of an animate or inanimate subject which would permit the keyboard to be used, with appropriate instruction cards, not only for spelling instruction and foreign language instruction but also for arithmetic instruction. It will be seen from the foregoing that the instructional apparatus according to the present invention may be used to teach a variety of topics, which need not be music related topics; That, for example, such subjects as spacial relations, mathmatics, spelling, foreign languages, etc. may all be taught; that the instrument provides not only a check on the correctness of the answer to each individual problem but also a reward for correctly answering a whole series of problems. In addition, in accordance with the present invention the student will have an incentive to work at a desired pace, since the melody can, to some extent, be chosen by the manufacturer to have a rhythm which is suited for the particular subject matter to be taught. In other words the time intervals for arriving at a correct answer, i.e., before the next note need be sounded to make the tune recognizable, can be adapted to the degree of complexity of the individual problems involved, with the more complex problems appearing in the sequence at such positions as to afford more time for response.

While we have disclosed several embodiments of the present invention it is to be understood that these embodiments are given by way of example only and not in a limiting sense, the scope of the present invention being determined by the objects and the appended claims.

What we claim is:

1. An educational apparatus comprising in combination:

tone generating means for generating a plurality of selected tones, a plurality of switch means associated with said tone generating means for actuating the latter to produce a selected tone in response to operator actuation of the corresponding one of said switch means, switch designating means including a plurality of symbolic representations each different from the remaining ones and each associated with a corresponding one of said switch means, instruction means comprising a series of symbolic representations in predetermined sequence, each of the symbolic representations of said instruction means having at least one characteristic which relates it more closely to one of the symbolic representations of said switch designating means than to any of the other of said symbolic representation of said switch designating means but being of a different species than said related one of said symbolic representation of said switch designating means, and said predetermined sequence of the symbolic representations on said instruction means being such that when the user correctly correlates each of the symbols on the instruction means with the related symbol on the switch designating means and actuates the switch means in the sequence shown by the instruction means a recognizable melody is produced by the apparatus.

2. The apparatus of claim 1 comprising a plurality of interchangeable instruction means, each of which is in the form of a card member having symbolic representations printed thereon.

3. The apparatus of claim 1 wherein said switch means are substantially located in a given plane, said apparatus comprising a plurality of interchangeable switch designation means each of which is in the form of a card member having symbolic representations printed thereon and each of which card members is adapted to be positioned in overlying relationship with the given plane of said switch means.

4. The apparatus of claim 3 comprising a housing for said tone generating means, said housing having alignment means for interchangeably receiving a selected one of said switch designation cards in a position in which the symbols on the received card will be in registry with corresponding ones of said switch means.

5. The apparatus of claim 4 wherein each said switch means comprises a pair of closely adjacent but normally spaced electrical contacts adapted to be pressed into contact with one another by relatively light pressure of the user's finger.

6. The apparatus of claim 5 wherein said switch designating card member is comprised of flexible material adapted to overlie said switch means so that finger pressure applied to a selected symbol on the overlying flexible switch designating card member will be transmitted therethrough to that one of the switch means located directly beneath such symbol.

7. The apparatus of claim 6 wherein said switch means are arranged in a grid pattern and the symbols on said card member are arranged in the same grid pattern.

8. The apparatus of claim 6 wherein said switch means comprises a sheet of rubber or rubber-like material, a layer of electrically conductive material on the back face of said sheet, a plurality of contacts arranged in a grid pattern in a given plane underlying said conductive layer, and a thin spacer sheet interposed between said given plane and said conductive layer and having cutouts in registry with the respective ones of said contacts whereby an electrical circuit is completed by depressing a portion of the rubber material in registry with a cutout, through the corresponding cutout, into engagement with the corresponding contact.

9. The apparatus of claim 1 comrising a plurality of interchangeable instruction means in the form of instruction card members and a plurality of interchangeable switch designation means in the form of keyboard card members, each of said keyboard card members being associated with at least one of said instruction card members to form together therewith a pair of card members cooperable with one another and with said tone generating means for producing a recognizable tune in response to the student giving the correct responses to each one of the series of questions on the associted instruction card.

10. The apparatus of claim 9 wherein different pairs of associated cards carry symbolic representations from different fields of endeavor for teaching different subjects.

* * * * *